United States Patent [19]

Bennett

[11] 4,164,972

[45] Aug. 21, 1979

[54] BOXED AWNING ASSEMBLY

[75] Inventor: J. Richard Bennett, Fullerton, Calif.

[73] Assignee: A & E Plastik Pak Co., Inc., Industry, Calif.

[21] Appl. No.: 798,785

[22] Filed: May 20, 1977

Related U.S. Application Data

[63] Continuation of Ser. No. 661,100, Feb. 25, 1976, abandoned.

[51] Int. Cl.² ............................................. F04F 10/06
[52] U.S. Cl. .................................... 160/66; 160/68; 135/5 AT
[58] Field of Search ................. 160/66, 68; 135/5 A, 135/5 AT; 220/4 F; 248/220.4, 222.1, 223.3, 224.4, 12

[56] References Cited

U.S. PATENT DOCUMENTS

| | | | |
|---|---|---|---|
| 1,329,816 | 2/1920 | Winslow | 248/12 |
| 3,019,333 | 1/1962 | Pascucci | 220/4 F |
| 3,612,145 | 10/1971 | Darula | 135/5 A |
| 3,722,571 | 3/1973 | Knight et al. | 160/68 |
| 3,782,443 | 1/1974 | Clauss et al. | 160/22 |
| 3,834,400 | 9/1974 | Sattler | 135/5 AT |
| 3,923,074 | 12/1975 | McKee | 135/5 AT |

Primary Examiner—Peter M. Caun
Attorney, Agent, or Firm—Ellsworth R. Roston

[57] ABSTRACT

An awning assembly including an awning, a pair of main support arms, and a pair of rafter arms is collapsible from an extended position to a stored position. In the stored position the awning assembly is enclosed in a box which is mounted to a wall. In the extended position the rafter arms extend from the box and the main support arms extend from the wall to support the awning. The box can be formed in four lightweight interlocking extrusions. A bracket braces the interlocking extrusions, supports the awning in the stored position, and elevates the rafter arms within the box. A foot is pivotal on each of the main support arms to permit attachment of the main support arm to the wall or ground.

15 Claims, 11 Drawing Figures

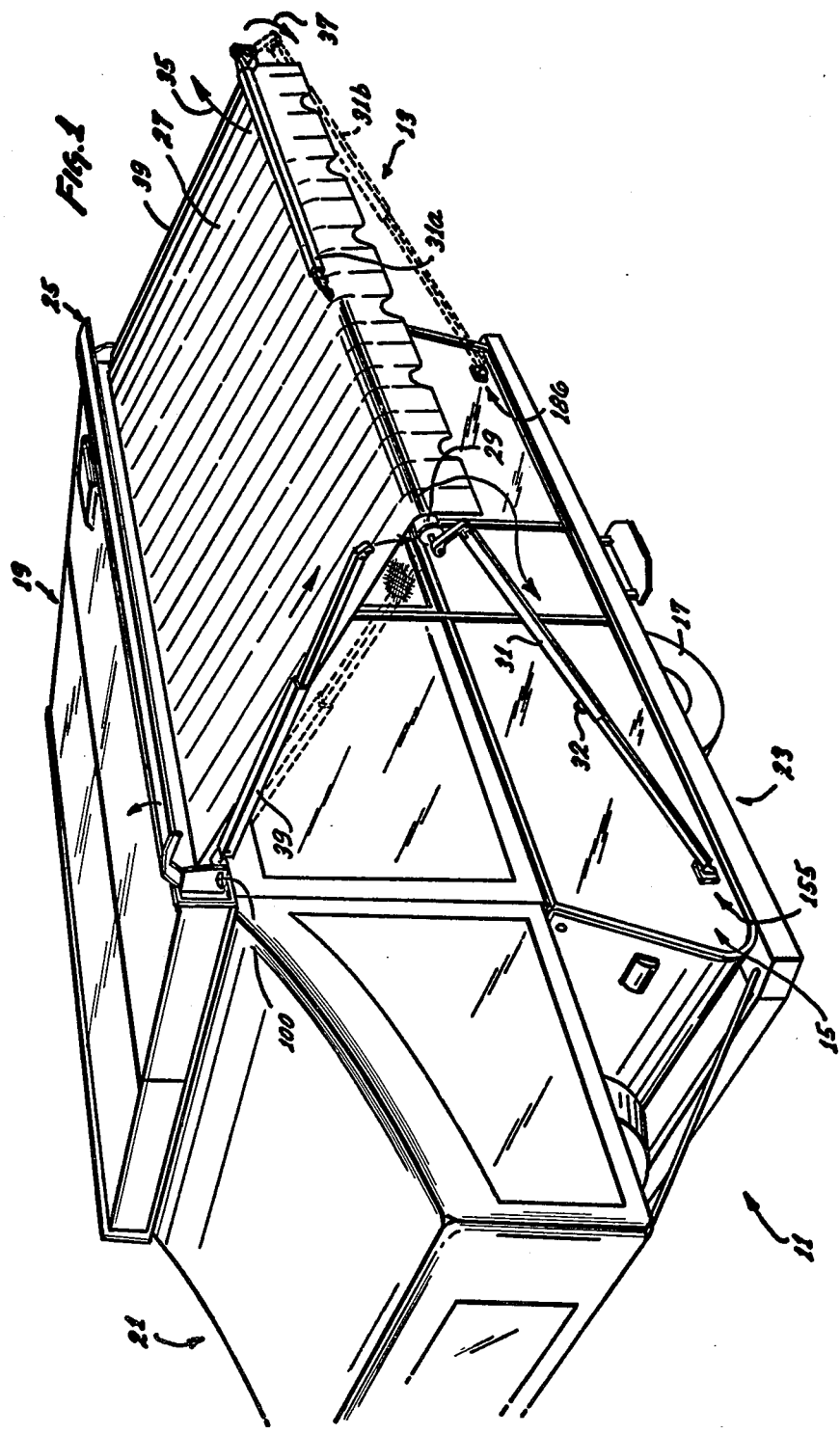

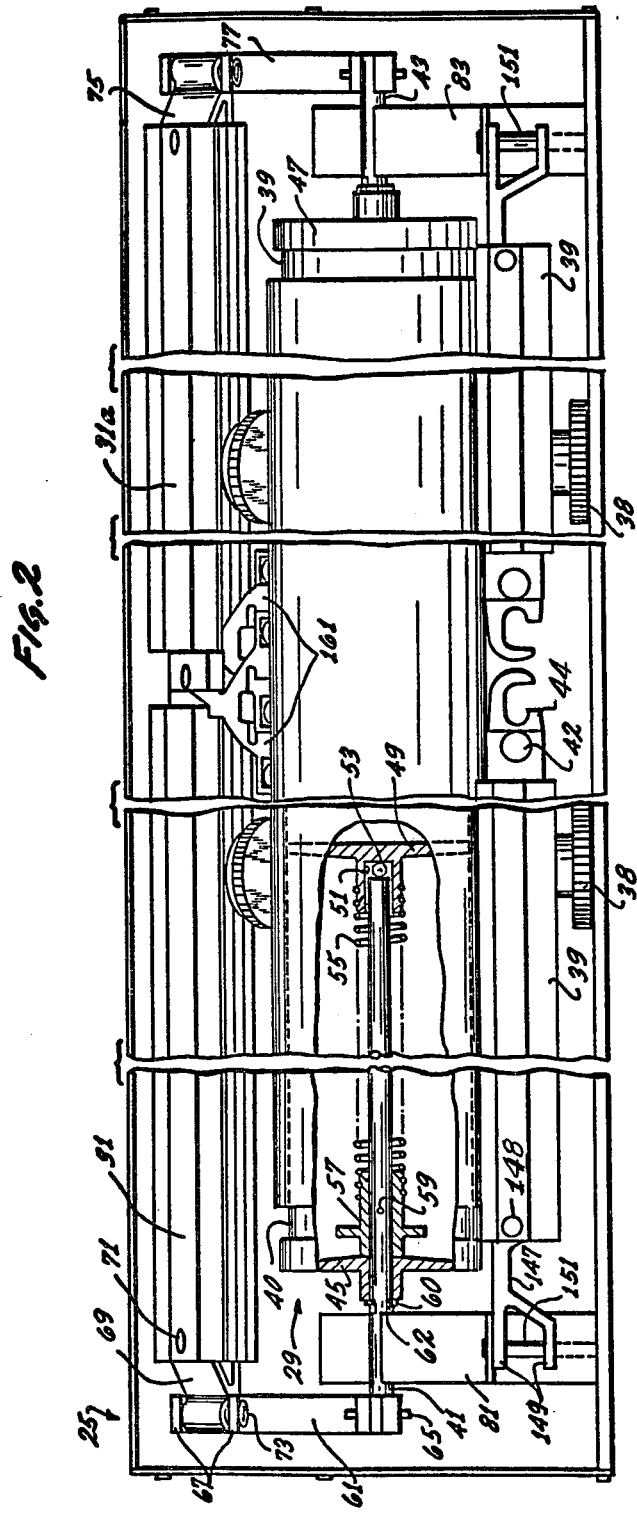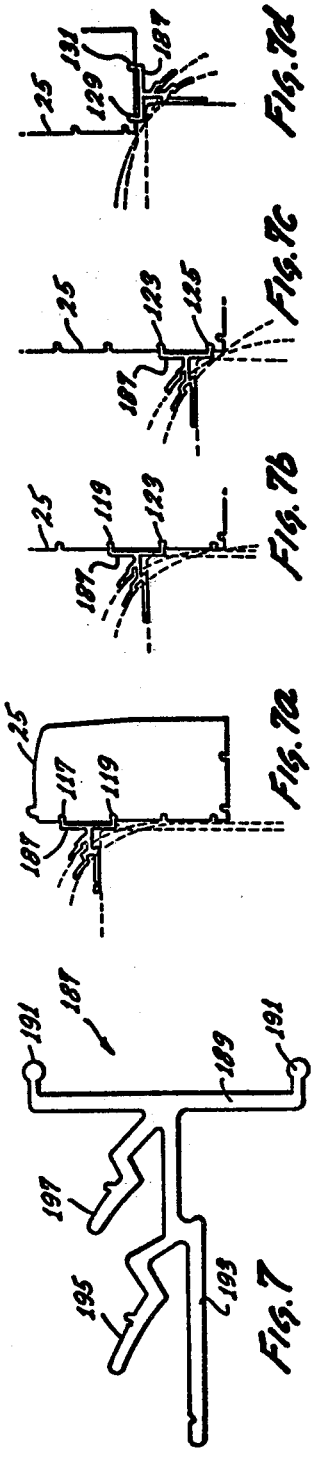

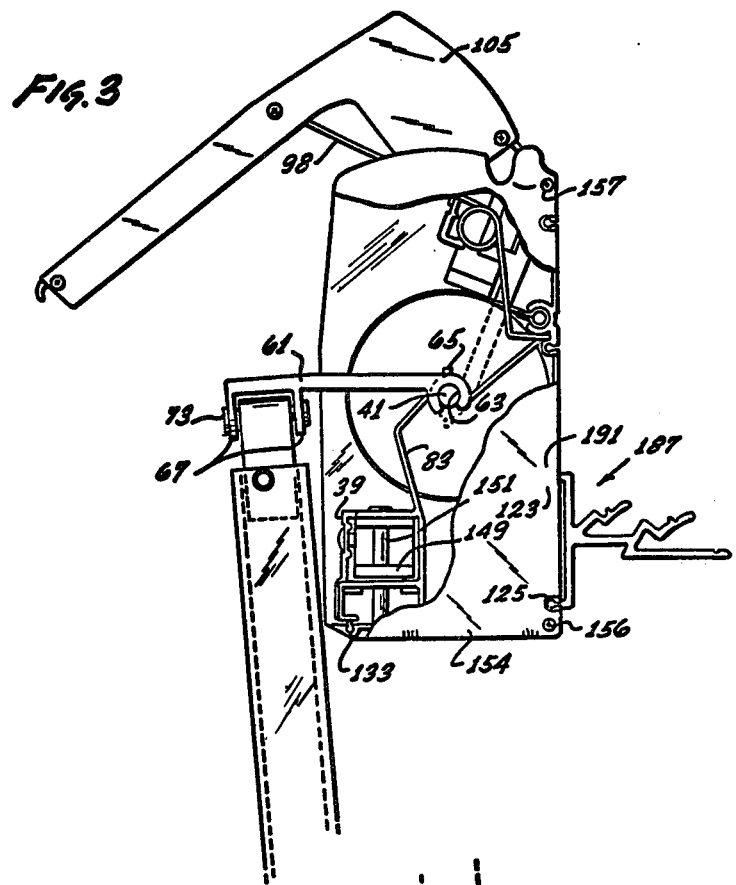
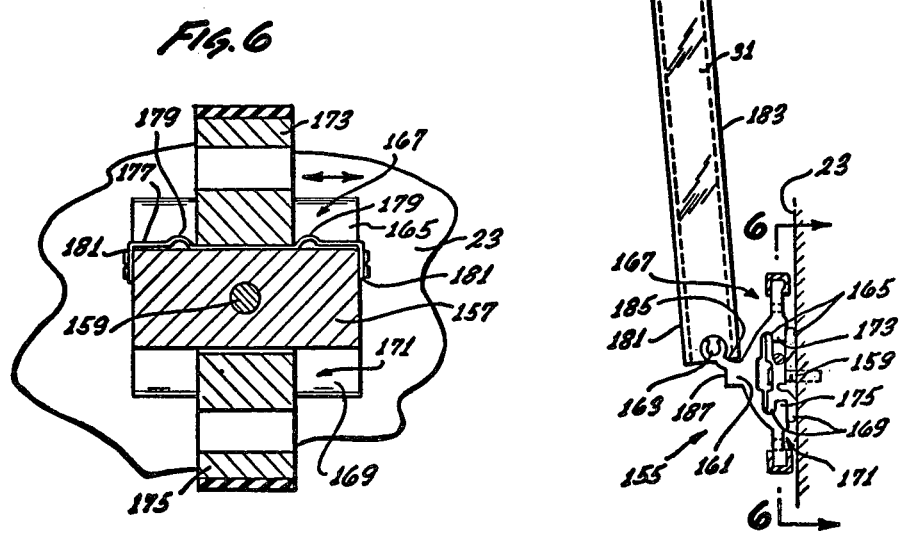

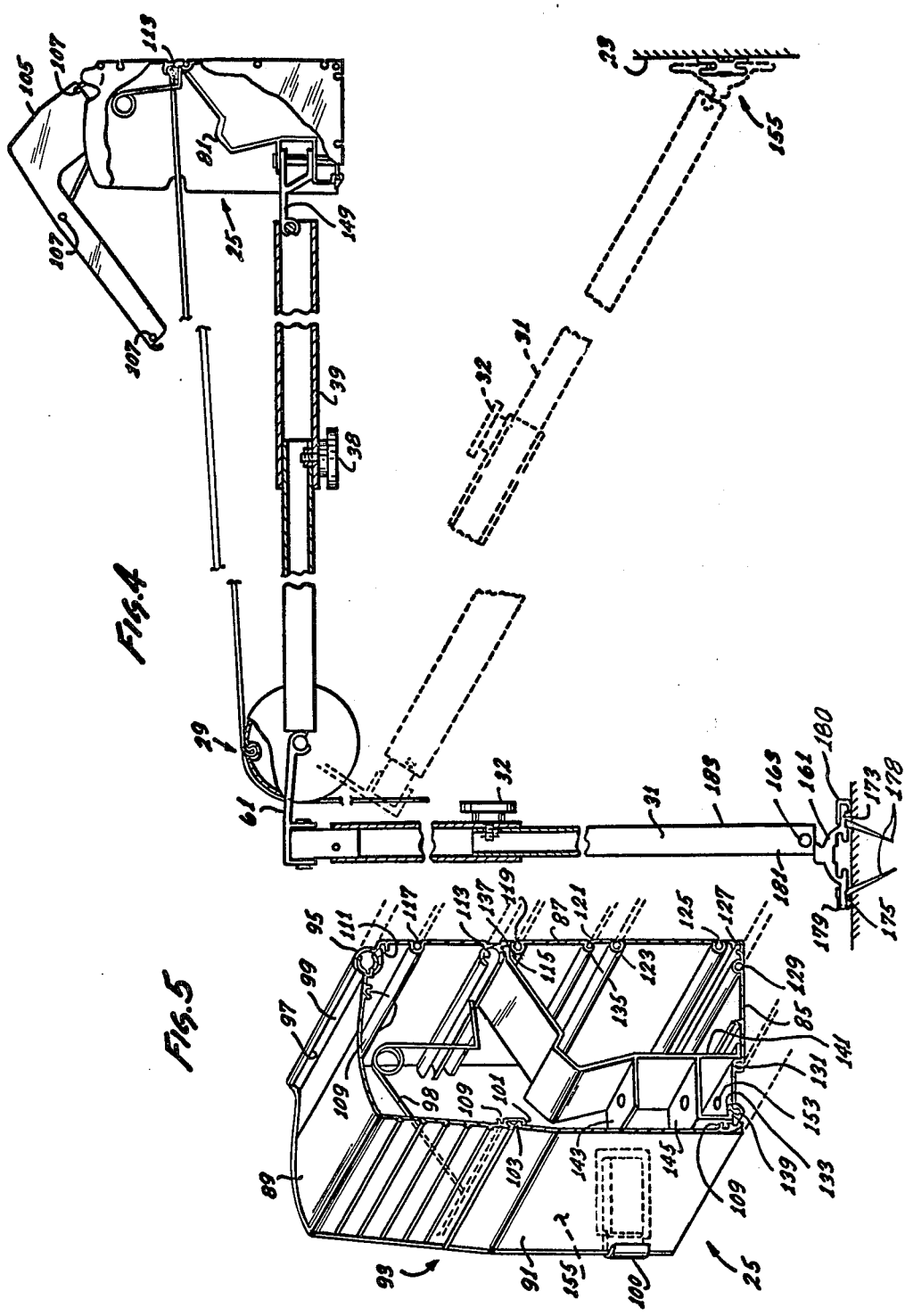

BOXED AWNING ASSEMBLY

This is a continuation of application Ser. No. 661,100, filed Feb. 25, 1976 now abandoned.

BACKGROUND OF THE INVENTION

1. Field of the Invention

The present invention is concerned generally with awning assemblies and more specifically with collapsible awning assemblies adapted for use with recreational vehicles.

2. Description of the Prior Art

In the past awning assemblies have included an awning, and a awning support structure having a main support arm and a rafter arm in each of a forward arm assembly and a rearward arm assembly. The awning assembly has been collapsible from an extended position to a stored position wherein the awning and the supporting structure have both been enclosed in a box mounted to a wall. In the extended position, the rafter arm has extended from the box and the main support arm has extended from the wall to support the awning.

In the past, the box has been formed from two extruded members, a first member forming a lid at the top and front of the box and a second member forming the back and bottom of the box. Both of these members have been relatively large structures and therefore have been extrudible only with use of relatively large dies. These large dies are not commonly available so that the number of suppliers for these box members have been very limited. As a consequence, the cost of the box members has been relatively great and lead times associated with the ordering of these parts has been excessive.

Of perhaps greater importance is the face that the thickness of the walls forming the box members has had to be relatively great in order to accommodate the extrusion process. The thick walls have been desirable to provide rigidity to the box but have been particularly disadvantageous due to the excessive weight.

Weight is of primary importance to awning assemblies which are adapted for use with recreational vehicles. For example, in some instances, the box must be mounted to the top of a tent trailer which is not designed to support structures of significant weight. Awnings of reduced weight are also of particular advantage since they are less likely to provide a gross vehicle weight in excess of highway regulations. This can be paramount importance particularly when other types of auxiliary equipment are included in a particular recreational vehicle.

In some cases brackets have been provided in the boxes to support the awning in the stored position. The brackets have been mounted to the box using rivets and their desired position has been difficult to locate. The rafter arms, which have been mounted beneath these brackets have been difficult to store in the box due to their contiguous relationship with the bottom of the box.

The lids of the boxes have been spring biased to an open position by torsion bars which have extended along the back of the box. These torsion bars have been particularly susceptible to breakage.

The main support arms have been attached to a shaft extending from a roller associated with the awning. This shaft has been bent in a 90° angle to provide the desired orientation between the main support arm and the roller. The bending of this rod has cracked the galvanized coating on the shaft so that rust has tended to form in these areas.

The main support arms have been provided with means for attaching the lower end of the arm to the wall. There has been no provision for disposing the main support arms in a substantially vertical orientation with the lower end of the arm in contact with the ground.

SUMMARY OF THE INVENTION

The awning assembly of the present invention is as much as twenty percent (20%) lighter than the assemblies of the prior art. This is accomplished without reducing the rigidity of the box. The rafter arms are mounted in elevated relationship to the bottom of the box to increase the ease with which they can be stored in the box. Brackets, which increase the rigidity of the box, are easily aligned within channels formed in the box and need not be riveted. A torsion spring which is axially bent does not undergo the stress associated with a torsion rod assembly and yet provides an excellent means for biasing the lid of the box in an open position. A pivotal foot on the end of the main support arm facilitates disposition of the arm in angular relationship to the wall or in vertical orientation to the ground.

The box associated with the awning assembly of the present invention can be formed with four box members. These box members are smaller than those associated with the boxes of the prior art and can be formed by smaller dies. Since there are many more suppliers that can provide the smaller extrusions, the cost of these parts is decreased and their availability is increased. More importantly, the parts can be provided with a thinner wall thickness to reduce the weight of the box.

The two parts forming the back and the bottom of the box can be loosely joined and braced by a bracket at either end of the box to provide the desired rigidity. This bracket can be disposed in channels formed in the extruded parts which automatically provide for the alignment of the bracket. One end of a torsion spring can be disposed in one of the channels associated with the bracket.

The bracket also provides means for supporting the awning in the stored position. In this stored position, the main support arm can be removed from the box and the inner end thereof attached to the wall while the awning remains supported by the bracket.

The rafter arms can be pivotally mounted between flanges on the brackets which support the rafter arm in elevated relationship to the bottom of the box. This elevated relationship facilitates disposition of the rafter arms in the stored position.

The shaft associated with the awning assembly need not be bent. Rather, a connecting member can be provided to extend from the shaft to provide means for pivotally attaching the upper end of the main support arm to the awning.

The lower end of the main support arm can be provided with a foot assembly which is pivotal between a first position which facilitates attachment of the foot assembly to the wall, and a second position which facilitates attachment of the foot assembly to the ground. Shoulders provided on the foot assembly contact opposite sides of the main support arm to inhibit movement of the foot assembly beyond the first and second positions. These first and second positions may have an angular displacement of 90°.

These and other features and advantages of the invention will become more apparent with a description of the preferred embodiments and reference to the associated drawings.

DESCRIPTION OF THE DRAWINGS

FIG. 1 is a perspective view of a recreational vehicle with an awning assembly of the present invention mounted thereon and deployed in an extended position;

FIG. 2 is a front elevational view of the awning assembly in a stored position;

FIG. 3 is a side elevational view of the awning assembly with a main support arm of the assembly vertically extended for connection to a wall;

FIG. 4 is a side elevational view of the awning assembly in alternative deployed positions;

FIG. 5 is a perspective view of a box and bracket associated with the awning assembly;

FIG. 6 is a cross-sectional view of the mounting assembly taken along lines 6—6 of FIG. 3;

FIG. 7 is a side elevational view of a bracket particularly adapted for use in mounting the awning assembly to the recreational vehicle;

FIG. 7a is a side elevational view of the box of the awning assembly mounted to the vehicle in a low position;

FIG. 7b is a side elevational view of the box of the awning assembly mounted to the vehicle in a higher position;

FIG. 7c is a side elevational view of the box of the awning assembly mounted to the vehicle in an even higher position; and FIG. 7d is a side elevational view of the box of the awning assembly mounted to the vehicle in a highest position.

DESCRIPTION OF PREFERRED EMBODIMENTS

A tent trailer is illustrated generally in FIG. 1 and designated by the reference numeral 11. An awning assembly 13 can be mounted on the trailer 11 and deployed to an extended position as illustrated in FIGS. 1 and 4. The tent trailer 11 is merely representative of many types of recreational vehicles such as mobile homes, motor homes, and travel trailers on which the awning 13 can be mounted. The awning 13 is particularly adaptable for use with recreational vehicles since it can be collapsed into a stored position as illustrated in FIG. 2 to facilitate movement of the vehicle, such as the trailer 11.

The trailer 11 includes a bottom portion 15 which is mounted to a frame supported by a pair of wheels 17. A top portion 19 of the trailer 11 is movable between an elevated position, as illustrated, and a lowered position. In the lowered position, the top portion 19 and the lower portion 15 are in contact so that they provide a low silhouette facilitating towing of the trailer 11. In the elevated position, the top portion 19 is supported by braces (not shown) so that a tent portion 21 can be deployed in the space separating the top portion 19 and the lower portion 15. When the trailer 11 is set up, the top portion 19, the tent portion 21 and the lower portion 15 form a side wall 23 from which the awning 13 extends.

The tent trailer 11 is illustrative of a particularly advantageous feature associated with the light weight of the awning assembly 13. It will be noted that this awning assembly 13 includes a box 25 which is mounted to the top portion 19 and therefore must be supported by the braces (not shown) which support the top portion 19 in the elevated position. These braces are collapsible and are not designed to support a significant amount of weight. For this reason, it can be appreciated that particularly in this type of recreational vehicle, an awning assembly such as the assembly 13 which is particularly light in weight is highly desirable.

The light weight is of further advantage since it does not significantly increase the gross weight of the trailer 11. In most states this gross weight must not exceed a particular value so that awning assemblies which are light in weight are highly desirable.

In addition to the box 25, the awning assembly 13 includes an awning 27 which may have a rectangular configuration. In the illustrated embodiment, one of the long sides of the awning 27 is fixed to the box 25. The opposite long side of the awning 27 is fixed to a roller assembly 29. The roller assembly 29 has properties for rolling the awning 27 into a compact configuration for placement in a stored position within the box 25. However, in the extended position illustrated, a supporting structure including a pair of arms at each of a forward end and a rearward end of the awning 27 maintains the roller assembly 29 in spacial relationship to the box 25.

For example, at the rearward end of the awning 27 a main support arm 31 is provided to extend between the roller assembly 29 and the wall 23. The main support arm 31 in a particular embodiment may telescope to adjust the height of the awning 27. The screw knob 32 of a conventional type may be provided to maintain the telescoping portions of the arm 31 at a desired length.

The main support arm 31 is stored above the roller assembly 29 in the stored position as illustrated by a main support arm 31a at the forward end of the trailer 11. From this position, the main support arm 31 can be pivoted upwardly and outwardly in the direction of an arrow 35 and then downwardly in the direction of an arrow 37 to the extended position illustrated by the dotted arm 31b.

A rafter 39 at each of the forward end and rearward ends of the awning 27 can be deployed from a stored position beneath the roller assembly 29 and the box 25. Each of these arms 39 includes a hook member 44 which is fixed to the outer end of the arm 39 for example by a pin 42. These arms 39 can be swung outwardly from the box 25 so that the hook members 44 engage the roller assembly 29. The arms 39 may have a telescoping configuration providing an adjustable length for varying the extension of the awning 27. A screw knob 38 may be provided to maintain the associated arm 39 at a desired length.

A more detailed description of these and other elements of the awning assembly 13 can be understood with reference to FIGS. 2 and 3. FIG. 2 also illustrates the relative disposition of these elements in the stored position within the box 25.

The roller assembly 29 includes a roller tube 40 which is supported at its ends by a pair of axles or shafts 41 and 43 which extend through respective end caps 45 and 47 fixed to the ends of the tube 40. The end cap 45 can be held in position by a washer 60 and crimped portions 62 of the shaft 41 which inhibit the outward movement of the washer 60.

In a particular embodiment, the roller assembly 29 may include a single shaft which extends through the entire length of the tube 40. In the illustrated embodiment, however, the shaft 41 extends only partially into roller tube 40 and the innermost end of the shaft 41 is pivotally mounted in a stabilizer 49 which is fixed to the roller tube 40. A cylindrical slot 51 can be formed in the stabilizer 49 to receive the innermost end of the shaft 41; and a ball bearing 53 can be disposed in the slot 51 to reduce friction forces between the end of the shaft 41 and the stabilizer 49.

The portions forming the slot 51 can have a cylindrical outer surface which is threaded to receive one end of a coiled spring 55. The opposite end of the spring 55 can be similarly registered with an idler 57 which is fixed to the shaft 41 by a pin 59. The end cap 45 is free to move on the shaft 41 so that it also moves in contiguous relationship with the idler 57.

It can be appreciated that if the innermost end of the spring 55 moves with the roller tube 39, and the outermost end of the spring 55 is held by the stationary shaft 41, the bias of the spring 55 is varied as the tube 39 rotates with respect to the shaft 41. This bias preferably aids in rolling of the awning 27 into a compact configuration so that the roller assembly 29 is aided in moving toward the stored position in the box 25. In a particular embodiment, a similar stabilizer 49, spring 55, and idler 57 may be provided for cooperation of the shaft 43 at the opposite end of the roller tube 40.

The main support arm 31 can be attached at its upper end to the shaft 41 by a connector 61. As best illustrated in FIG. 3, the connector 61 can be provided with a slot 63 at its innermost end. This slot 63 is preferably oriented to receive the shaft 41 in substantially perpendicular relationship to the length of the connector 61. A pin 65 can be provided to extend through the shaft 41 and the portions defining th slot 63 to fix the connectors 61 to the shaft 41.

A pair of apertured flanges 67 can be provided at the opposite end of the connector 61. In a preferred embodiment, these flanges 67 have a generally planar configuration and extend substantially parallel to the axis of the shaft 41. The flanges 67 are separated sufficiently to receive a connector 69 which is fixed to the end of the main support arm 31 by a pin 71. The connector 69 can be suitably slotted to receive a pin 73 which also extends through the apertures in flanges 67. In this manner, the connector 69 and associated main support arm 31 is free to pivot about the pin 73. If the pin 73 is provided with a substantially perpendicular relationship to the shaft 41, the main support arm 31 will be pivotable in a plane which is substantially parallel to the shaft 41. The connector 61 is preferably of sufficient length to provide for the disposition of the main support arm 31 in a stored position above and substantially parallel to the roller assembly 29 within the box 25. The main support arm 31a at the forward end of the supporting structure can be similarly attached to the shaft 43 by connectors 75 and 77 which are similar to the connectors 69 and 61 respectively.

In the stored position, the roller assembly 29 can occupy a position generally centrally of the box 25 with the main support arms 31 and 31a disposed above the roller assembly 29 and the rafter arms 39 disposed generally beneath the roller assembly 29. A pair of brackets 81 and 83 can be provided interiorly of the box 25 to cradle the respective shafts 41 and 43 to support the roller assembly 29 in this preferred central position. These brackets 81 and 83 are of primary importance to the invention since they not only cradle the roller assembly 29 but also provide means for mounting the rafter arms 31 and means for bracing the box 25. These features can be more easily understood with a description of a preferred construction of the box 25 and reference to FIGS. 4 and 5.

The box 25 can be formed from four box members, designated by consecutive odd numerals between 85 and 91, which can be individually extruded from aluminum. It is of particular advantage that the box 25 can be formed with more than two box members and still provide the desired rigidity. By forming the box 25 from the four box members 85–91, each of the members can be individually extruded using a relatively small die. Since only a few suppliers have dies which can accommodate large extrusions, the smaller box members 85–91 can be provided by a greater number of suppliers. This reduces the cost and increases the availability of these parts.

The smaller extrusions forming the box members 85–91 can also be made with walls of reduced thickness. This of course means that the box 25 will have a reduced weight. In fact, in a preferred embodiment, the weight of the box 25 is reduced by as much as 40%. With the reduced weight, the awning assembly 13 provides less of a load on the vehicle to which it is mounted and also provides a minimal increase in the gross weight of the vehicle.

The box members 85 and 87 combine to form the back and bottom of the box 25 while the box members 89 and 91 combine to form a lid 93 for the box 25. The lid 93 in a preferred embodiment hinges on the uppermost edge of the box portion 87 at the back of the box 25.

A preferred hinge assembly includes portions 95 of the box member 87 which define a cylindrical channel which runs along the length of the box 25. The portions 95 also define a forward facing longitudinal slot 97 which extends into the channel.

The lid 93 can include similar portions 99 which define a cylindrical outer surface. This outer surface preferably has a diameter slightly smaller than the cylindrical inner surface of the portions 95 by greater than the width of the slot 97. With the portions 99 disposed within the portions 95, the lid 93 can be easily pivoted on the box portion 87 at the top and back of the box 25.

On the side of the box member 89 opposite to the portions 99, portions 101 can be extruded to form a dove channel along the length of the box 25. This dove channel is appropriately configured to register with dove tails 103 which are formed along the upper edge of the box member 91. The joint formed by the portions 101 and the dove tails 103 provides a high degree of rigidity for the lid 93. This rigidity can be further increased with the provision of end plates 105 (FIG. 4) which can be fixed to the ends of the lid 93 by screws 107 extending into a plurality of channels 109 in the box members 89 and 91.

In addition to the hinge portions 95, the box member 87 can be formed with channels defined by the consecutively odd numerals between 111 and 121. Longitudinal slots extend into the channels 111, 113 and 115 from the inside of the box 25 and into the channels 117, 119 and 121 from the outside of the box 25. As illustrated in FIG. 4, the channel 113 is adapted to receive the inner edge of the awning 27 in a conventional manner.

The box member 85 can be similarly extruded to form channels designated by the consecutive odd numerals 123 and 133. Longitudinal slots extend into the channels 127 and 133 from the inside of the box 125 and extend into the channels 123, 125, 129 and 131 from the outside of the box 25.

An enlarged bead 135 can be formed along the uppermost edge of the box member 85. This bead 135 can have a generally cylindrical outer surface which registers with the inner surface of the channel 121 in the box member 87. Thus the box members 85 and 87 can be joined by sliding the bead 135 into the channel 131.

Any tendency of the box portions 85 and 87 to pivot at this junction can be inhibited by connecting the brackets 81 and 83 between these box members 85 and 87. Thus, in a preferred embodiment, the bracket 83 is provided with an enlarged bead 137 which registers with the channel 115 in back of the box member 87 and an enlarged bead 139 which registers with the interiorly facing channel 133 in the bottom of the box member 85. Thus the brackets 81 and 83 provide the box members 85 and 87 with a high degree of rigidity which is particularly desirable for the construction of the box 25. This rigidity can be further enhanced by forming the brackets 81 and 83 to provide a leg portion 141 which extends into contiguous relationship with the bottom of the box 25 along a line disposed inwardly of the channel 132.

The rigidity of the box 25 can be further increased by providing end plates 154 which are fixed to the ends of the box members 85 and 87 by a plurality of screws 152 which extend into the channels 111, 127 and 133.

The brackets 81 and 83 are further desirable since they provide a means for pivotally attaching the rafter arms 39 to the box 25 at a position elevated above the bottom of the box 25. This elevated position is desirable in order to provide sufficient clearance between the rafter arm 29 and the bottom of the box 25 to accommodate the knobs 38 in the stored position as illustrated in FIG. 2. Thus the brackets 81 and 83 can be provided with a pair of apertured flanges 143 and 145 which extend outwardly of the box 25 substantially parallel to the bottom of the box 25. The innermost end of the rafter arm 39 can be pivotally attached to a connector 148 by a pin 149 which in a preferred embodiment extends substantially parallel to the bottom of the box 25. The opposite end of the connector 148 can be provided with apertured flanges 149 which can be mounted between the flanges 143 and 145 in the bracket 81.

A pin 151 can be passed through the apertures in the flanges 143, 149 and 145 and also through a hole 153 in the bottom of the box 25. (In the illustrated embodiment, the pin 151 extends substantially perpendicular to the pin 149). Thus the bracket 81 and the pin 151 provide means for pivotally mounting the rafter arm 39 interiorly of the box 25.

It is particularly advantageous to provide the bracket 81 with the enlarged beads 137 and 139 which register with respective channels 115 and 133 since the bracket 81 is automatically aligned transversely of the box 25. Then by passing the pin 151 through the bracket 81 and the hole 153, the bracket 81 can be held in a desired position longitudinally of the box 25. The lid 93 can be biased to an open position by a spring 98 which is bent axially and extends transversely of the box 25 between the channel 109 and the lid 93 and the channel 115 in the back of the box 25. In the stored position, the lid 93 can be closed and locked into position by a pair of latches 100 shown in FIG. 5. These latches 100 of a conventional type can be mounted on the end plates 154 at either end of the box 25.

At the end of the main support arm 31 opposite the connectors 61, a mounting assembly 155 provides another feature of particular advantage to the awning assembly 13. This mounting assembly 155 is illustrated in FIGS. 3, 4 and 6. The mounting assembly 155 includes a bracket 157 which can be mounted in fixed relationship to the wall 23 for example by a screw 159. The bracket 157 is preferably positioned at a lower point on the wall 23 and is in substantial vertical alignment with the associated end of the box 25. The mounting assembly 155 also includes a foot member 161 which is pivotally mounted to the main support arm 31 by a pin 163.

In a preferred embodiment of the mounting assembly 155, the bracket 157 includes a pair of flanges 165 which extend upwardly in FIG. 3 and define a slot or channel shown generally at 167. Similar flanges 169 extend downwardly in FIG. 3 and define a slot or channel shown generally at 171. The foot 161 is provided with a pair of flanges 173 and 175 having inwardly extending portions which are slidably engageable with the respective slots 167 and 171 in the bracket 157. The slots 167 and 171 are substantially parallel to each other and therefore permit the foot 161 to be slid into engagement with the bracket 157 from either side of the bracket 157.

In order to retain the foot 161 in mounting engagement with the bracket 157, a leaf spring 177 may be provided in one of the slots 167 or 171. The spring 177 can be bent to form a pair of bumps 179 which are separated a distance greater than the width of the foot 161 as illustrated in FIG. 6. The ends of the spring 177 can be bent along the sides of the bracket 157 and fixed by a pair of screws 181. When the foot 161 is slid over one of the bumps 179, that bump 179 depresses to permit movement of the foot 161 to a central location on the bracket 157 between the pair of bumps 179.

The foot 161 can be registered with the bracket 157 in the manner described to provide a pivotal mount on the wall 23 for the main support arm 31. It is of particular advantage, that the foot 161 can also be disengaged from the bracket 157 to permit movement of the main support arm 31 to a substantially vertical orientation with respect to the ground. This vertical orientation is illustrated by the solid lines in FIG. 4. In this orientation, it will be noted that flanges 173 and 175 in the foot 161 can also extend outwardly to form a substantial base or pedestal for the foot 161. The outward extensions of the flanges 173 and 175 can be suitably apertured to permit a pair of stakes 177 to be driven through the foot 161 into the ground. Rubberized end caps 180 can be provided at the outermost edges of the flanges 173 and 175.

Referring again to FIG. 3, it will be noted that the main support arm 31 can have a generally rectangular cross-section partially formed by a pair of oppositely facing sides 181 and 183. In cooperation with these sides 181 and 183 the foot 161 in the mounting assembly 155 can be provided with shoulders 185 and 187 which limit the angular displacement of the foot 167 with respect to the main support arm 31. For example, as illustrated in FIG. 3, the shoulder 185 contacts the side 183 of the main support arm 31 to inhibit any further counterclockwise rotation of the foot about the pin 163. In this first position the flanges 173 and 175 of the foot 161 have a substantially parallel relationship with the main support arm 31 and also with the wall 23 when the roller assembly 29 is in the stored position. This facilitates mounting of the foot 161 on the bracket 157 as the first step in the deployment of the roller assembly 29.

In a similar manner, the side 181 of the main support arm 131 can contact the shoulder 187 as illustrated in FIG. 4 to inhibit any further clockwise rotation of the foot 161 about the pin 163. In this second position, the flanges 173 and 175 of the foot 161 have a substantially perpendicular relationship to the main support arm 31. This facilitates positioning of the main support arm 31 in the vertical orientation with the foot 161 contacting the ground. It follows that the angular displacement of the foot 161 between the first and second positions is substantially 90° in this preferred embodiment.

A mounting assembly 186 similar to the assembly 155 can be provided for mounting the other main support arm 31b to the wall 23. The mounting bracket of this mounting assembly 186 is preferably located at the same height of the mounting bracket 157 but in vertical alignment with the forward end of the box 25.

A plurality of brackets such as the one designated by the reference numeral 187 in FIG. 7 are particularly advantageous for mounting the box 25 to the top of a recreational vehicle. In many cases, the top of the vehicle has a generally curved configuration in longitudinal cross-section. For example, the curved configurations may be those illustrated by the dotted lines in FIGS. 7a through 7d.

The bracket 187 includes a flange 189 having longitudinal beads 191 which extend laterally of the flange 189 at the outermost edges thereof. These beads 191 are spaced a distance which coincides with the separation of the channels 117, 118, 123, and 125 on the back of the box 25 as illustrated in FIG. 5. This same constant distance separates the channels 129 and 131 on the bottom of the box 25. By sliding the beads 191 of the bracket 187 into an associated pair of these channels, the box 25 can be mounted in several positions depending upon the configuration of the particular recreational vehicle.

Three additional flanges 193, 195 and 197 are connected to extend laterally of the flange 189 on the side thereof opposite the beads 191. One of these flanges 193-197 is to be attached to the vehicle, such as the trailer 11, depending upon the desired orientation of the box 25. These flanges 193, 195 and 197 have different angles with respect to the flange 189. For example the flange 193 may have a 90° angle, the flange 195 a 30° angle, and the flange 197 a 40° angle with respect to the flange 189. It will be apparent that other flanges could be providing having other angular relationships with the flange 189 to increase the variety of positions in which the box 25 could be mounted to a particular recreational vehicle.

Some of these positions are illustrated in FIGS. 7a to 7d. The FIG. 7a, the beads 191 of the bracket 187 are disposed in the channels 117 and 119 near the top of the box 25. In FIG. 7b, the beads 191 are disposed in the channels 119 and 123 which are located centrally of the back of the box 25 in the illustrated embodiment. FIG. 7c illustrates that the box 25 can be mounted in a slightly higher relationship with the top of the vehicle by disposing the beads 191 in the channels 123 and 125 at the bottom of the back of the box 25. In an even higher orientation of the box 25, the bracket 187 can be inverted and mounted to extend along the side of the recreational vehicle with the beads 191 disposed in the slots 129 and 131 at the bottom of the box 25.

In the stored position, the roller assembly 29 and all of the arms 31 and 39 will be enclosed by the box 25 and a lid 93 will be locked into position by the latches 100 as shown in FIG. 5. To deploy the awning assembly 13, the latches 100 can be unlocked and the lid 93 raised to an open position where it is held by the bias of the springs 98 as illustrated in FIG. 3. Initially the main support arms 31 can be removed from their stored position above the roller assembly 29 and pivoted outwardly about the pin 73 and downwardly about the shaft 41 to a substantially vertical position. In this position, the feet 161 of the mounting assembly 155 can be easily slid into position over the bracket 157.

Having fixed the lower ends of the main support arms 31 to the wall 23, the arms 31 can be telescoped to increase their length sufficiently to raise the roller assembly 29 above the cradle formed by the brackets 81 and 83 within the box 25. This length can be maintained by tightening the screw knobs 32.

From this elevated position, the roller assembly can be moved outwardly of the box 25 to the extended position illustrated in FIGS. 1 and 4. As the roller assembly 29 is moved outwardly, the awning 27 will unroll from the roller tube 39 and the angles between the main support arms 31, 31a and the wall 23 will increase.

In the extended position, the bias of the spring 55 in the roller assembly 29 will tend to move the roller assembly 29 back toward the box 25. To inhibit this return movement, the rafter arms 39 can be pivoted outwardly of the box 25 about the ends 151. With a loose telescoping relationship, the hook members 40 at the outermost ends of the rafter arms 39 can be brought into engagement with the associated shafts 41 and 43 in the roller assembly 29. Then by tightening the screw knobs 38, the length of the rafter arms 39 can be fixed to inhibit their compression. This will provide the arms 39 with a rigid configuration to oppose the tendency of the roller assembly 29 to return to the box 25.

If desired, the main support arm 31 can be moved to a vertical orientation by removing the foot 161 from the bracket 157 and transferring the foot to a position on the ground. The foregoing steps for deploying the awning assembly 13 can be reversed to return the awning assembly 13 from the extended position illustrated in FIG. 4 to the stored position illustrated in FIG. 2.

It can be seen that the awning assembly 13 of the present invention provides many features which are of significant advantage. By forming the box 25 in four sections, smaller dies can be used in an extrusion process. This will not only increase the number of suppliers which can form these parts but more importantly, the weight of the box 25 can be decrease by as much as 20%.

Although the box members 85 and 87 must be joined in this lightweight awning assembly, the desired rigidity can be achieved by providing a mounting bracket which also functions as a brace. By suitably channeling the box members 85 and 87, the brackets 81 and 83 can be easily aligned transversely within the box 25. Brackets 81 and 83 can also provide means for pivotally mounting the rafters 39 within the box 25 at an elevated position above the bottom of the box 25.

A special mounting assembly 155 is particularly desirable for mounting the main support arm 31 alternatively to the wall 23 or to the ground. A special bracket 187 is also particularly desirable for mounting the box 25 in a variety of positions on the recreational vehicle.

Although the awning assembly 13 has been described with reference to particular embodiments, it will be apparent that the assembly can be otherwise embodied so that the scope of the invention should be ascertained only with reference to the following claims.

I claim:

1. An awning assembly deployable from a stored position in proximity to a wall to an extended position extending from the wall, comprising:
   a flexible sheet member forming an awning and having stored and extended conditions;
   means including at least one main support arm and at least one rafter arm for supporting the awning in the extended position;
   a container assembly connectible to the wall for enclosing at least the awning in the stored position;
   a first back member included in the container assembly and defining a first wall of the container assembly;
   a second back member included in the containr assembly and extending in a direction transverse to the first back member and defining a second wall of the container assembly;
   a plurality of channels disposed at spaced positions in at least one of the first and second back members;
   a bracket having a pair of beads constructed to fit removably in a pair of spaced channels to provide for a variable disposition of the container relative to the wall, the bracket having a first flange extending between the beads and having a further flange extending in a transverse direction from the first flange for support by the wall;
   means coupled to the first back member and the second back member for bracing the container assembly to provide a rigid relationship between the first back member and the second back member;
   a lid pivotable with respect to the first and second back members of the container assembly to provide for the reception of the awning in the stored position in the container and the unrolling of the awning from the container;
   means including the bracing means for providing for a storage of the awning in the container in the stored condition on the bracing means;
   means including the bracing means for providing for a storage of the rafter arm in the container in fixed relationship to the bracing means at a position below the awning and for providing for a pivotal movement of the rafter arm relative to the container to obtain the disposition of the awning in the extended condition; and
   connector means including the bracing means, and having first and second ends, for providing for a storage of the main support arm in the container in a fixed relationship to the bracing means at a position above the awning and for providing a coupling of the main support arm to the awning at one end and for providing for a pivotal movement of the main support arm relative to the bracing means in a first plane about the second end of the connector means as a fulcrum in a second plane transverse to the first plane and independetly of the movement of the main support arm relative to the rafter arm in the first plane.

2. The awning assembly recited in claim 1 wherein the main support arm is provided with a foot constructed to be braced against the wall or to be supported on the ground.

3. The awning assembly set forth in claim 1 wherein the main support arm is pivotable relative to the bracing means at a first end and is provided at its second end with a foot member having a first flange and a second flange oppositely disposed relative to the first flange and a bracket is disposed on the wall and is provided with channels to receive the flanges on the foot member and hold the main support arm, the rafter arm and the awning in fixed relationship to the wall.

4. The awning assembly set forth in claim 1 further comprising:
   spring means coupled between the lid and the back of the container assembly for biasing the lid to an open position with respect to the back of the container assembly.

5. The awning assembly recited in claim 4 wherein the rafter arm is stored in the container at a position below the awning and the main support arm is stored in the container at a position above the awning and wherein the means for pivoting the main support arm relative to the bracing means provides for a pivotal movement of the main support arm to a position above the awning in the container and a pivotal movement of the main support arm into folded relationship in the container.

6. An awning assembly for mounting on a wall comprising:
   container means mountable on the wall;
   a plurality of channels disposed externally on the container means at spaced positions;
   a bracket constructed to support the container means on the wall and having a first flange and at least a pair of beads on the first flange at positions spaced in accordance with the spacing of the channels to provide a removable and variable support of the container means by the bracket and having a second flange extending from the first flange in a direction transverse to the first flange for support of the bracket on the wall;
   awning means forming an awning and having stored and extendible positions and being deployable in the stored position interiorly of the container means and in the extended position extending from the container means and being movable between the stored and extendible positions;
   roller means disposed at the extended arm of the awning means for providing for a deployment of the awning means between the stored and extended positions;
   at least one rafter arm having a stored position in the container means and extendible from its stored position in the container means to support the awning means in the extended position, a first end of the rafter arm being constructed to provide for a detachable coupling of the rafter arm to the roller means;
   a main support arm attachable to the wall and extendible from the wall to support the awning means in the extended position;
   bracket means disposed interiorly of the container means for supporting the awning means interiorly of the container means in the stored position while permitting attachment of the main support arm to the wall;
   first means having first and second opposite ends and coupled at the first end to the roller means and coupled at the second end to the main support arm to provide for pivotable movement of the main support arm relative to the roller means in two planes transverse to each other and disposed in the container means at a position above the awning to provide for a lifting of the awning means from the bracket means and a deployment of the awning means from the stored position to the extended position; and second means coupled to the bracket means and the rafter arm at a second end of the rafter arm opposite to the first end for providing for a pivotal movement of the rafter arm from the container for coupling to the roller means in the extended position of the awning means.

7. The awning assembly recited in claim 6 wherein the container means includes:
a first container member;
a second container member disposed in transverse relationship to the first container member and forming with the first container member two sides of the container means;
a lid member pivotable on the first container member between open and closed positions and defining the container means with the first container member and the second container member for storing the awning means in the stored position;
the bracket means being coupled between the first container member and the second container member to brace the container means; and
spring means disposed in the container for maintaining the lid in the open position.

8. The awning assembly recited in claim 7 wherein the main support arm has a foot member at its end opposite to the end coupled to the roller means and the foot member has first and second flanges extending in opposite directions to provide for a stable disposition of the foot member on the ground and to provide for attachment of the foot member to channels in a bracket on the wall.

9. The awning assembly set forth in claim 7 wherein the bracket means are constructed to retain the awning means at an intermediate position in the container means and the first means are constructed to retain the main support arm in the container means at a position above the roller means for lifting of the awning means from the bracket means and removal of the awning means from the container means and the second means are constructed to retain the rafter arm in the container means at a position below the roller means; and
the container means are provided with beads at a plurality of spaced positions along the first and second container means and brackets are provided for disposition in the beads in easily detachable relationship to the container means to support the container means on the wall at positions relative to the wall dependent upon the particular ones of the beads in which the brackets are disposed.

10. An awning assembly for mounting on a wall on which is disposed a bracket assembly comprisingy
container means mountable on the wall;
a plurality of channels disposed at spaced positions externally on the container means;
a bracket having a first flange and beads disposed at the end of the flange in spaced relationship from each other for removable disposition in variable pairs of spaced channels and having a second flange extending from the first flange in transverse relationship to the first flange for support on the wall;
awning means forming an awning having stored and extended positions and deployable between the stored and extended positions and disposed in the stored position interiorly of the container means and extending in the extended position from the container means;
at least one rafter arm having first and second ends and coupled to the first end to the container means and extendible from the container means to support the awning means in the extended position;
roller means operatively coupled to the awning means to provide for a deployment of the awning means between the stored and extended positions;
bracket means disposed in the container means for retaining the awning means in the stored position in the container means;
the rafter arm having its inner end pivotally coupled to the bracket means and being constructed at the second end to be coupled to the roller means in the extended position of the awning means;
at least one main support arm constructed to be stored in the container means and having first and second ends and having its first end pivotally attached to the roller means;
a foot member connected to the second end of the main support arm, the foot member being constructed to be disposed on the ground to provide a stable support for the awning means when disposed on the ground and to be attached to the bracket assembly disposed on the wall; and
connector means having first and second ends and pivotally attached at the first end to the first end of the main support arm and pivotally attached at its second end to the roller means for indpendent pivotal movement of the main support arm relative to the roller means in two planes transverse to each other and for lifting of the roller means from the bracket means when the roller means is to be deployed from the stored position to the extended position.

11. The awning assembly set forth in claim 10 wherein
the bracket assembly includes portions defining a pair of channels extending in opposite directions and
wherein portions of the foot member define a pair of flanges registerable with the channels in the bracket assembly in locking relationship with the bracket assembly when the foot member is to be attached to the bracket assembly.

12. The awning assembly set forth in claim 11 wherein
the flanges of the foot member extend in a particular plane for stable disposition on the ground to support the awning means with the foot member resting on the ground and wherein means are included for providing a pivotable disposition of the foot member relative to the main support arm to facilitate the stable disposition of the flanges on the ground the the disposition of the foot member in the channels of the bracket assembly and the container means are provided with retention means at spaced positions on the container means and holding means are constructed to be retained by individual ones of the retention means on the container means and are provided with flanges to retain the container means in a fixed relationship to the wall dependent upon the individual ones of the retention means retaining the holding means.

13. The awning assembly set forth in claim 11 wherein
the pivotal attaching means for the main support arm provides for the disposition of the roller means at an intermediate position in the container means and for the disposition of the main support arm at a position above the roller means in the container means and provides for the lifting of the roller means for the bracket means in the container means and the pivotal movement of the pivotal attaching means in the two planes when the roller means is to be deployed from the stored position to the extended position and the bracket means extend between two adjacent walls in the container means to brace the container means.

14. The awning assembly set forth in claim 10 wherein means are supported by the bracket means and are coupled to the rafter arm at the first end of the rafter arm to provide for a pivotal movement of the rafter arm relative to the container means when the rafter means is to be deployed from the stored position to the extended position and wherein the container means includes a lid member pivotable between open and closed positions to open the container means for deployment of the awning means from the stored position to the extended position, and wherein the retention means constitute beads on the container means and the holding means constitute brackets.

15. The awning assembly recited in claim 12 wherein the foot member is constructed to provide for a disposition of the foot member in a first relationship to the main support arm when the foot member is to be attached to the bracket assembly and to provide for a pivotal movement of the foot member through a particular angle relative to the main support arm when the foot member is to be supported on the ground.

* * * * *